July 16, 1963 D. C. LIVINGSTON 3,098,173

SWITCHING CIRCUIT FOR USE WITH ELECTROLUMINESCENT DISPLAY DEVICES

Filed Jan. 25, 1960 2 Sheets-Sheet 1

INVENTOR
DONALD C. LIVINGSTON
BY [signature]
ATTORNEY

July 16, 1963 D. C. LIVINGSTON 3,098,173

SWITCHING CIRCUIT FOR USE WITH ELECTROLUMINESCENT DISPLAY DEVICES

Filed Jan. 25, 1960 2 Sheets-Sheet 2

INVENTOR
DONALD C. LIVINGSTON
BY [signature]
ATTORNEY

United States Patent Office 3,098,173

Patented July 16, 1963

3,098,173

SWITCHING CIRCUIT FOR USE WITH ELECTROLUMINESCENT DISPLAY DEVICES

Donald C. Livingston, Bayside, N.Y., assignor to Sylvania Electric Products Inc., a corporation of Delaware Filed Jan. 25, 1960, Ser. No. 4,253
4 Claims. (Cl. 315—169)

This invention relates to switching circuits and in particular to switching circuits for use with electroluminescent display devices.

One form of electroluminescent display device consists of an electroluminescent phosphor layer or film having first and second mutually orthogonal arrays of parallel, separated, electrical conductors positioned on each side thereof to form a crossed-grid structure. When a suitable voltage is applied between a selected conductor of the first array and a selected conductor of the second array, the portion of the electroluminescent layer located at the crossover point of the selected conductors is caused to glow. The degree of luminescence which this portion (defined as a cell) exhibits is dependent upon the magnitude and frequency of the applied voltage.

It has been found that if the applied voltage is switched in succession from cell to cell, then each cell will luminesce in turn, producing an effect similar to that resulting from the scanning action developed in the cathode ray tube of a conventional television receiver. The apparatus required to perform this switching must be simple and yet function rapidly and with a high degree of reliability.

Accordingly, it is an object of the present invention to provide an improved switching circuit.

Another object is to provide an improved switching circuit which permits the successive high-speed energization of a large number of electroluminescent cells or other devices.

Still another object is to provide an improved and highly reliable switching circuit for use with electroluminescent panels which requires a mininum number of components.

A further object is to provide an improved switching circuit which permits the selective energization of a plurality of electroluminescent cells in a sequence determined by an applied input signal.

In the present invention, a switching circuit is provided in which one or more magnetic cores are used to control the voltage across a load element. Each core is provided with an output winding, an input winding, and one or more control windings. The output winding is coupled to the load element, the input winding to a source of input voltage having both a direct and an alternating component, and the control winding or windings to a control circuit. In the absence of a control signal, current flows only in the input widing, the direct component of this current producing a high flux density which saturates the core. No voltage is induced in the output winding, or appears across the load element, under these conditions.

When the control circuit is energized by application of a signal from an external source, direct current is caused to flow in the control winding. The direction of this control current and the direction of the windings on the core is such as to produce a flux which opposes the flux generated by the current in the input winding. By making the control current large enough, the core is driven out of saturation. The alternating component of the input voltage then produces a change in flux density, which causes a voltage to be induced in the output winding and to appear across the load. Thus, when the core is in its saturated state, the voltage across the output winding is zero; whereas, when the core is unsaturated, the alternating component of voltage across the input winding induces a voltage in the output winding.

The switching circuit described is particularly adapted for use with a crossed-grid electroluminescent structure having spaced first and second arrays of parallel, separated, electrical conductors. These conductor arrays are generally perpendicular to each other, although the angle between them may have any value greater than zero degrees. A layer of electroluminescent material placed between the two arrays of conductors responds to the presence of an electric field by emitting light in the areas encompassed by the applied field.

In one embodiment of the invention, each electrical conductor in the first array is connected to the output winding of a corresponding one of a first set of magnetic cores, while each electrical conductor in the second array is coupled to the output winding of a corresponding one of a second set of magnetic cores. Thus, the phosphor cells located between the conductors at the crossover points are each connected in series with the output windings of two magnetic cores.

In this embodiment, each of the magnetic cores is provided with a pair of control windings. One of these control windings has one end connected to a target electrode of a first magnetron beam switching tube while the other winding has one end connected to a target electrode of a second beam switching tube. The cathodes of both beam switching tubes are coupled back to the other ends of the two control windings through a source of direct voltage. When the target electrodes connected to both control windings are conducting, the direct current through the two windings is sufficient to drive the core out of saturation, and a voltage is induced in the output winding. If both cores associated with a given phosphor cell are driven out of saturation in this way, then the alternating voltage across the cell will be sufficient to cause it to luminesce. On the other hand, if only one, or neither, of the control windings on either core is conducting, then the core will not be driven out of saturation, a negligible voltage will appear across the phosphor cell, and it will not glow.

In another embodiment of the invention, a single control winding is coupled through a first resistance element to a target electrode in one of the beam switching tubes and through a second resistance element to a target electrode in the other beam switching tube. D.-C. current must be supplied to the single control winding through both resistance elements in order to drive the core out of the saturated state produced by the D.-C. current in its input winding.

The above objects of the present invention and the brief introduction thereto will be more fully understood and further objects and advantages will become apparent from a study of the following detailed description in connection with the drawings wherein.

Figure 3:
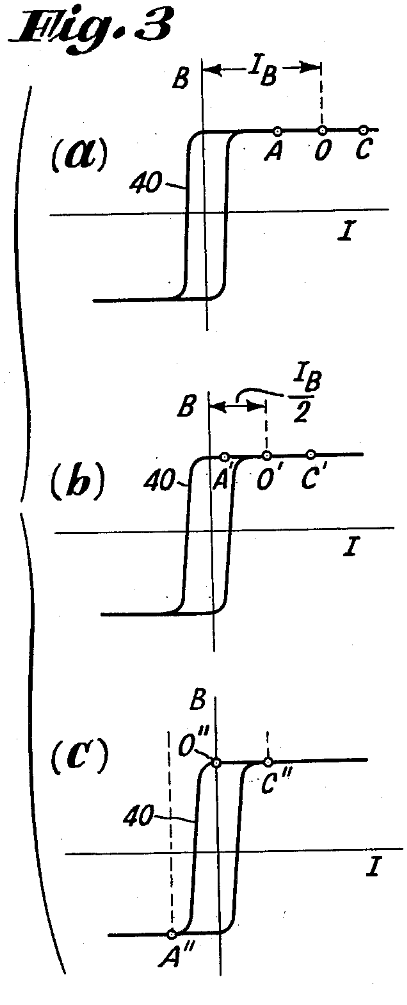
Figure 4:
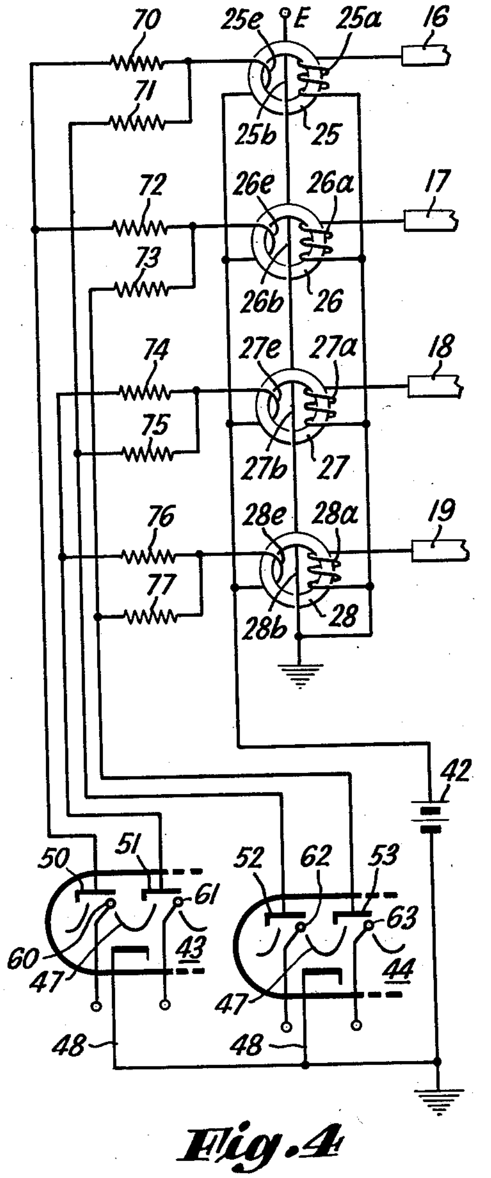
Figure 2:
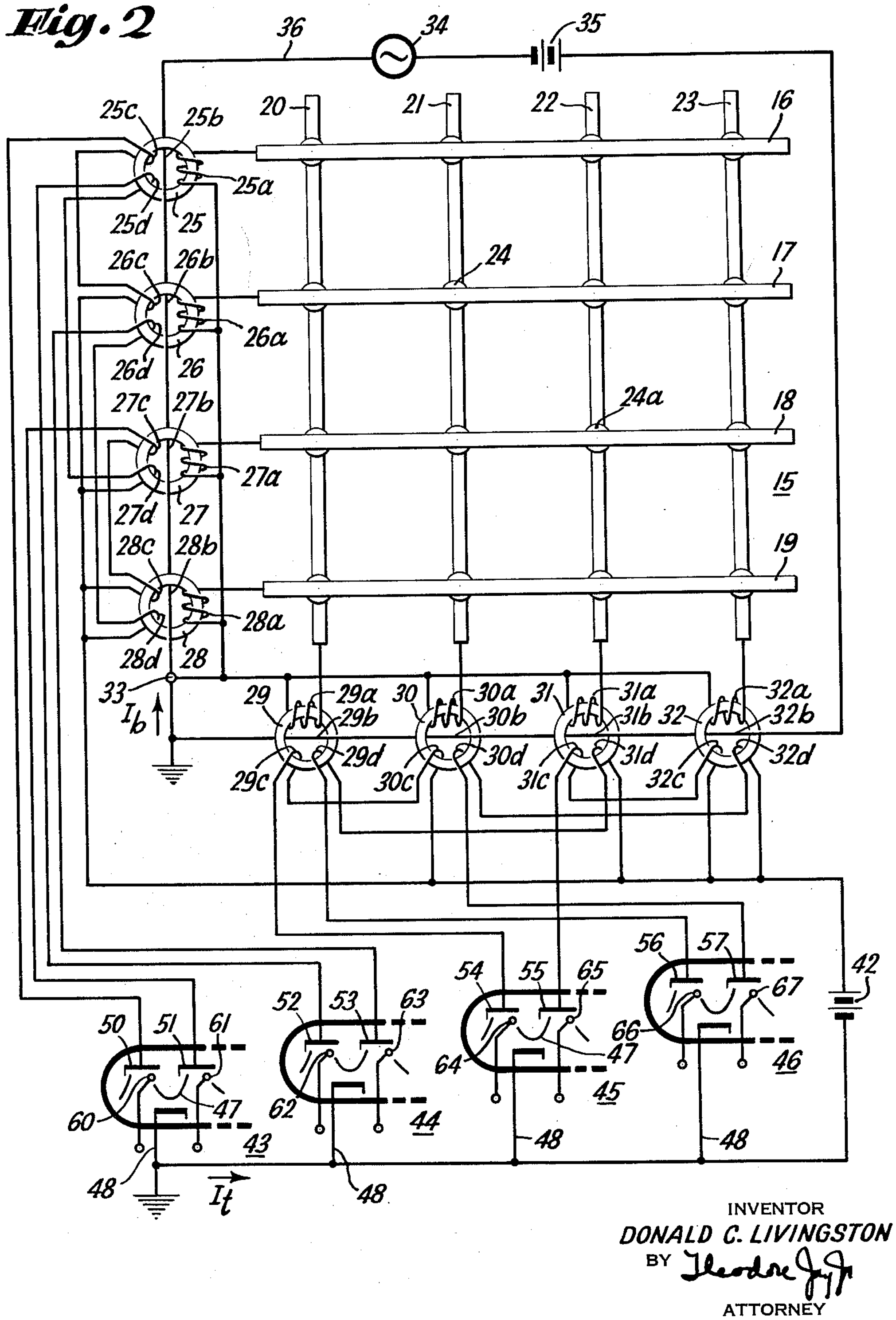
FIG. 2 is a schematic diagram of an embodiment of the invention in which magnetic cores having two control windings are controlled by a pair of beam switching tubes.

FIGS. 3(*a*)–3(*c*) show hysteresis curves of a magnetic core of the type depicted in FIG. 2 for various operating conditions; and FIG. 4 is a schematic diagram showing a portion of a second embodiment of the invention in which magnetic cores having a single control winding are controlled by a pair of beam switching tubes.

Figure 1:
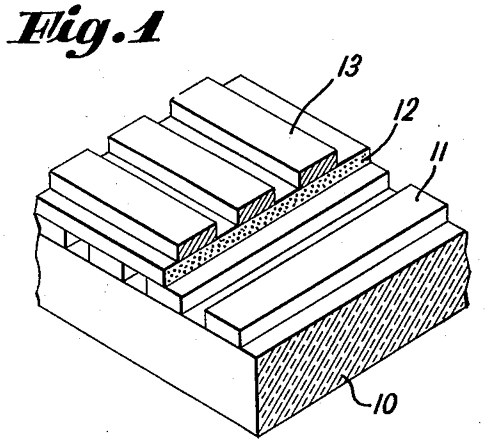
FIG. 1 is a section of a typical crossed-grid electroluminescent structure.

Referring to FIG. 1, there is shown a typical electroluminescent crossed-grid structure comprising a glass plate 10, a first array of horizontal, transparent, electrical conductors 11, an electroluminescent layer 12 and a second array of vertical, electrical conductors 13. When a selected one of the horizontal conductors 11 and a selected one of the vertical conductors 13 are energized, an electric field is produced between them, causing the phosphor cell at the crossover point between the two conductors to luminesce. If voltages are applied to the conductors sequentially, a scanning action is obtained, the cells luminescing one after the other in a predetermined pattern.

FIG. 2 is a schematic diagram of the switching apparatus of this invention used in conjunction with a crossed-grid electroluminescent panel 15 of the type depicted in FIG. 1. Panel 15 is shown schematically as consisting of four horizontal conductors 16, 17, 18, and 19 and four vertical conductors 20, 21, 22, and 23. Only four conductors are shown in each direction for simplicity, but it will be understood that in a practical structure one hundred or more conudctors may be provided in each direction. A phosphor cell is shown graphically by a circle located at the crossover point between each pair of conductors. Thus, for example, phosphor cell 24 would be activated by energizing electrical conductors 21 and 17 by a suitable alternating voltage, and phosphor cell 24*a* would be activated by applying a voltage to conductors 18 and 22.

Ring-shaped magnetic cores 25, 26, 27, and 28, each having a single aperture, are associated with each of the horizontal conductors 16–19, and identical single-apertured ring-shaped magnetic cores 29, 30, 31, and 32 are associated with each of the vertical conductors 20–23. The output windings 25*a*–28*a* each have one end connected to the horizontal conductors 16–19, respectively, and their other ends connected to a common junction point 33. Similarly, the output windings 29*a*–32*a* of cores 29, 30, 31, and 32 each have one end connected to conductors 20–23, respectively, while the other ends of the windings are also connected to grounded junction 33. In addition to the output windings 25*a*–32*a*, the magnetic cores are provided with input windings 25*b*–32*b* and control windings 25*c*–32*c* and 25*d*–32*d*.

Input windings 25*b*–32*b* are formed by a single wire 36 which threads each of the cores 25–32 and is connected in series with an alternating voltage source 34 and a direct voltage source 35. The direct current component $I_b$ which flows through input windings 25*b*–32*b* has a magnitude which is greater than the amplitude of the alternating current component and is large enough to saturate cores 25–32 in the absence of current in the control windings. Since the cores are saturated and the amplitude of alternating voltage source 34 is relatively small, there is little or no change in the flux density of the cores and, therefore, no voltage is induced in the output windings 25*a*–32*a*.

This is illustrated graphically in FIG. 3(*a*) which shows a typical hysteresis curve 40 for a square-loop magnetic core of the type used in the circuit of FIG. 2. With no current in the control windings, the operating point O of the core is well out into the saturation region of the curve and although the dynamic operating point swings between points A and C, practically no change occurs in the flux density B.

Returning to FIG. 2, it is seen that each of the control windings 25*c*–32*c* and 25*d*–32*d* is connected in series with a direct voltage source 42, another control winding, and a target electrode of one of four magnetron beam switching tubes 43, 44, 45, and 46. Beam switching tubes known commercially as Burroughs Type 6700, having ten target electrodes, or tubes similar thereto, are suitable for this application. In order to avoid complicating the drawing, only two target electrodes or anodes have been shown in each tube, although it will be understood that if a crossed-grid structure having one hundred horizontal and one hundred vertical electrodes is used, then all ten target electrodes in each tube will be coupled to the control windings. Also, the voltage connections to the spade elements 47 have not been shown, and the tubes have been depicted schematically instead of in their usual cylindrical form.

The cathodes 48 of beam switching tubes 43–46 are connected to the negative terminal of direct poltage source 42. The positive terminal of voltage source 42 is connected to one end of control windings 26*c*, 27*d*, 28*c*, and 28*d* as well as 30*c*, 31*d*, 32*c*, and 32*d*. One end of control winding 25*c* is connected to target electrode 50 of beam switching tube 43, while the other end is coupled to control winding 26*c*. Similarly, control winding 25*d* is connected to target electrode 52 of tube 44 and to control winding 27*d*; control winding 26*d* to target electrode 53 and control winding 28*d*; and control winding 27*c* to target electrode 51 and control winding 28*c*. In the same way, control winding 29*c* is coupled to target electrode 54 and control winding 30*c*; control winding 29*d* to target electrode 56 and control winding 31*d*; control winding 30*d* to target electrode 57 and control winding 32*d*; and control winding 31*c* to target electrode 55 and control winding 32*c*.

When a control pulse is applied to one of the beam switching elements 60–67, current flows between the cathode and the target electrode associated with the energized switching element. If a pulse is applied to a switching element immediately to the right of the energized element, the beam switches to the target electrode associated with this second switching element. Also, by applying control pulses to adjacent switching elements in rapid succession, the beam will effectively switch from the first element energized to the last. For example, applying a control pulse to the switching element (not shown) to the left of element 60 of beam switching tube 43 produces conduction between cathode 48 and target electrode 50. Direct current then flows from battery 42 through control windings 26*c* and 25*c*, target electrode 50, cathode 48 and back to the battery. The direction of this current and the direction of windings 25*c* and 26*c* relative to input windings 25*b* and 25*c* is such as to cause the control current to oppose the magnetic field produced by the current in the input windings.

Referring to FIG. 3(*b*), cores 25 and 26 now operate at points O', located approximately midway between point O (FIG. 3(*a*) and the zero-current axis of the hysteresis loop. The current $I_t$ through each of the beam switching tubes is equal to approximately one-half of the D.-C. component of the input current $I_b$. Therefore, the dynamic operating point in shifting between points A′ and C′ (as alternating voltage source 34 completes each cycle) traverses a region in which the change in flux density B is small. Thus, the voltage induced in the output windings 25*a* and 26*a* remains negligible.

If a control pulse is now applied to beam switching element 63 associated with target electrode 53 of tube 44, a D.-C. current $I_t$ will flow in control winding 26*d* as well as winding 26*c*. Core 26 is then driven completely out of saturation, assuming an operating point O″ as shown in FIG. 3(*c*). During each cycle of alternating voltage source 34, the flux density swings between its minimum and maximum values, inducing an alternating voltage in output winding 26*a* which is applied to conductor 17. It shall be noted that core 26 is now unsaturated, cores 25 and 28 are partially saturated, while core 27 is completely saturated. Similarly, to excite vertical conductor 21, magnetic core 30 must be driven out of saturation. This may be accomplished in a manner analogous to that described for core 26 by applying control pulses to beam switching elements 64 and 67, thereby causing target electrodes 54 and 57 of beam switching tubes 45 and 46 to conduct.

A modified control circuit which may be used with the invention is illustrated in FIG. 4. In this embodiment, the two control windings shown on each of the cores 25–32 in FIG. 2 are replaced by single control windings 25*e*–32*e*. Cores 29–32, and their associated control circuits are not shown in FIG. 4, it being understood that these circuits are similar to those described in connecnection with cores 25–28. Also, input windings 25*b*–28*b* are connected to a source of voltage E having direct and alternating components equivalent to those produced by voltage sources 34 and 35 (FIG. 2).

Each of the control windings 25e–28e has one end connected to the positive terminal of direct voltage source 42 and the other end coupled through a pair of resistors to target electrodes in beam switching tubes 43 and 44. Thus, control winding 25e is connected through resistor 70 to target electrode 50 and resistor 71 to target electrode 52; control winding 26e through resistor 72 to target electrode 50 and resistor 73 to target electrode 53; control winding 27e through resistor 74 to target electrode 51 and resistor 75 to target electrode 52; and control winding 28e through resistor 76 to target elecrtrode 51 and resistor 77 to target electrode 53.

As described in connection with the circuit of FIG. 2, cores 25–28 are normally saturated by the D.-C. component of the current through the input windings 25b–28b. In order to induce a voltage in one of the output windings 25a–28a, the associated core is driven out of saturation by a D.-C. current through its control winding. Thus, if it is desired to energize conductor 17, pulses are applied to the appropriate beam switching element of tubes 43 and 44 thereby causing current flow through target electrodes 50 and 53 of beam switching tubes 43 and 44 and resistors 72 and 73 to control winding 26e. Current must flow through both resistors 72 and 73 in order to produce an appreciable change in the flux density in core 26, current through only one resistor being insufficient to overcome the magnetic flux generated by the input winding. In a similar manner, a voltage may be produced across the output winding of each of the cores. It will be noted that each target electrode is coupled to two control windings; thus, only one half of the current from one tube flows through each control winding. This is in contrast to the embodiment of FIG. 2 wherein the entire beam switching tube current flows through each control winding.

A significant feature of this invention is that extremely high-speed beam switching tubes are used in conjunction with magnetic cores to provide rapid, reliable scanning of an electroluminescent device. When used for the control of an electroluminescent display panel, the rapid response of this switching circuit makes it possible to energize the individual phosphor cells in any predetermined order and at a speed governed principally by the response of the electroluminescent material used. In one form of the invention, in which two control windings are provided on each core, the total target electrode current flows through each winding to provide high-speed blocking and unblocking of the cores. In a second form of the invention, the control current is decreased, but only one control winding is required on each core.

As many changes could be made in the above construction and many different embodiments could be made without departing from the scope thereof, it is intended that all matter contained in the above description or shown in the accompanying drawings shall be interpreted as illustrative and not in a limiting sense.

What is claimed is:

1. An electroluminescent device comprising first and second spaced arrays of electrical conductors, the conductors in said first array passing over the conductors in said second array to form a plurality of crossover points, a plurality of electroluminescent cells located between said conductors at said crossover points, and a plurality of single-apertured ring-shaped magnetic cores each having an output winding, an input winding, and at least one control winding, one end of the output winding on each of said magnetic cores being connected to a corresponding one of said electrical conductors, the other ends of said output windings being connected to a common junction, beam switching tube means coupled to each of said control windings, said beam switching tube means coupling a direct voltage to selected control windings in response to an applied signal.

2. An electroluminescent device comprising first and second spaced arrays of electrical conductors, the conductors in said first array passing over the conductors in said second array to form a plurality of crossover points, an electroluminescent layer interposed between said first and second array of conductors, first and second sets of single-apertured ring-shaped magnetic cores each core having an input winding, an output winding, and at least one control winding, one end of the output winding on each of said magnetic cores being connected to a corresponding one of said conductors, the other ends of said windings being connected to a common junction, means coupling the input winding on each of said cores to a voltage source having direct and alternating components, the direct current component of said voltage source being of sufficient magnitude to completely saturate said magnetic cores, and a plurality of beam switching tubes coupled to the control windings on each of said cores for driving selected cores out of saturation, the alternating component of the voltage across the input windings of said selected cores inducing alternating voltages in the output windings of said selected cores for application to the corresponding electrical conductors.

3. An electroluminescent device comprising first and second spaced arrays of electrical conductors, the conductors in said first array passing over the conductors in said second array to form a plurality of crossover points; a plurality of electroluminescent cells located between said conductors at said crossover points, a plurality of magnetic cores each having an output winding, an input winding, and a control winding, one end of the output winding on each of said magnetic cores being connected to a corresponding one of said electrical conductors, the other ends of said output windings being connected to a common junction; and switching tube means including first and second beam switching tubes, each of said beam switching tubes having a cathode adapted for coupling to a voltage source and a plurality of anodes, each of said control windings being coupled to an anode in said first beam switching tube and an anode in said second beam switching tube.

4. An electroluminescent device comprising first and second spaced arrays of electrical conductors, the conductors in said first array passing over the conductors in said second array to form a plurality of crossover points; a plurality of electroluminescent cells located between said conductors at said crossover points, and a plurality of single-apertured ring-shaped magnetic cores each having an output winding, an input winding, and two control windings, one end of the output winding on each of said magnetic cores being connected to a corresponding one of said electrical conductors, the other ends of said output windings being connected to a common junction; means coupling one of the control windings on each core in series with a control winding on at least one other core; a plurality of beam switching tubes, each of said beam switching tubes having a cathode coupled to a direct voltage source, and a plurality of anodes; means for coupling one of the control windings on each of said magnetic cores to a corresponding anode in one of said plurality of beam switching tubes, and for coupling the other control winding on said magnetic core to a corresponding anode in another of said beam switching tubes, said beam switching tubes selectively coupling said direct voltage source to said control windings in response to an applied signal.

References Cited in the file of this patent

UNITED STATES PATENTS

| | | |
|---|---|---|
| 2,774,813 | Livingston | Dec. 18, 1956 |
| 2,884,566 | Kazan | Apr. 28, 1959 |
| 2,922,076 | Sack | Jan. 19, 1960 |
| 2,937,298 | Putkovich | May 17, 1960 |

OTHER REFERENCES

Rajchman and Briggs: Transfluxor Controlled Electroluminescent Display Panels, Proceedings of the I.R.E., November 1958, pages 1808 to 1824.